(12) United States Patent
Shung

(10) Patent No.: US 7,315,550 B2
(45) Date of Patent: *Jan. 1, 2008

(54) METHOD AND APPARATUS FOR SHARED BUFFER PACKET SWITCHING

(75) Inventor: Chuen-Shen Bernard Shung, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 854 days.

This patent is subject to a terminal disclaimer.

(21) Appl. No.: 10/703,523

(22) Filed: Nov. 10, 2003

(65) Prior Publication Data
US 2004/0090976 A1  May 13, 2004

(51) Int. Cl.
H04L 12/54 (2006.01)

(52) U.S. Cl. .................. 370/412; 370/429; 370/470

(58) Field of Classification Search ........... 370/412, 370/429, 470
See application file for complete search history.

(56) References Cited

U.S. PATENT DOCUMENTS

| | | | |
|---|---|---|---|
| 5,499,263 A | 3/1996 | Schmit et al. | |
| 5,541,912 A | 7/1996 | Choudhury et al. | |
| 5,745,491 A | 4/1998 | Ando et al. | |
| 5,838,677 A | 11/1998 | Kozaki et al. | |
| 5,905,725 A | 5/1999 | Sindhu et al. | |
| 5,910,928 A | 6/1999 | Joffe | |
| 6,044,061 A | 3/2000 | Aybay et al. | |
| 6,061,358 A | 5/2000 | Nelson et al. | |
| 6,094,435 A | 7/2000 | Hoffman et al. | |
| 6,272,143 B1 | 8/2001 | Lin et al. | |
| 6,377,546 B1 | 4/2002 | Guerin et al. | |
| 6,700,894 B1 * | 3/2004 | Shung .................. 370/412 | |

* cited by examiner

*Primary Examiner*—Chi Pham
*Assistant Examiner*—Albert T. Chou
(74) *Attorney, Agent, or Firm*—Squire, Sanders & Dempsey L.L.P.

(57) ABSTRACT

A shared buffer packet switching device is provided for receiving data packets via associated ones of a plurality of receive ports, and for transmitting data packets via associated selected ones of a plurality of transmit port. The device includes: a shared buffer unit for temporarily storing at least a portion of each of a plurality of the data packets received via the receive ports, the shared buffer including a plurality of word locations each being associated with a shared buffer memory address value, and having an associated word storage space, the word storage spaces defining a shared buffer memory width; a tail buffer for temporarily storing remainder portions of selected ones of the received data packets, the tail buffer including a plurality of tail buffer locations each being associated with a tail buffer memory address value, and an associated tail data storage space, the tail data storage spaces defining a tail buffer memory width; and a source managing unit for receiving packets via the input ports, and being operative to store each of the received packets in selected ones of the word locations and the tail buffer locations.

17 Claims, 4 Drawing Sheets

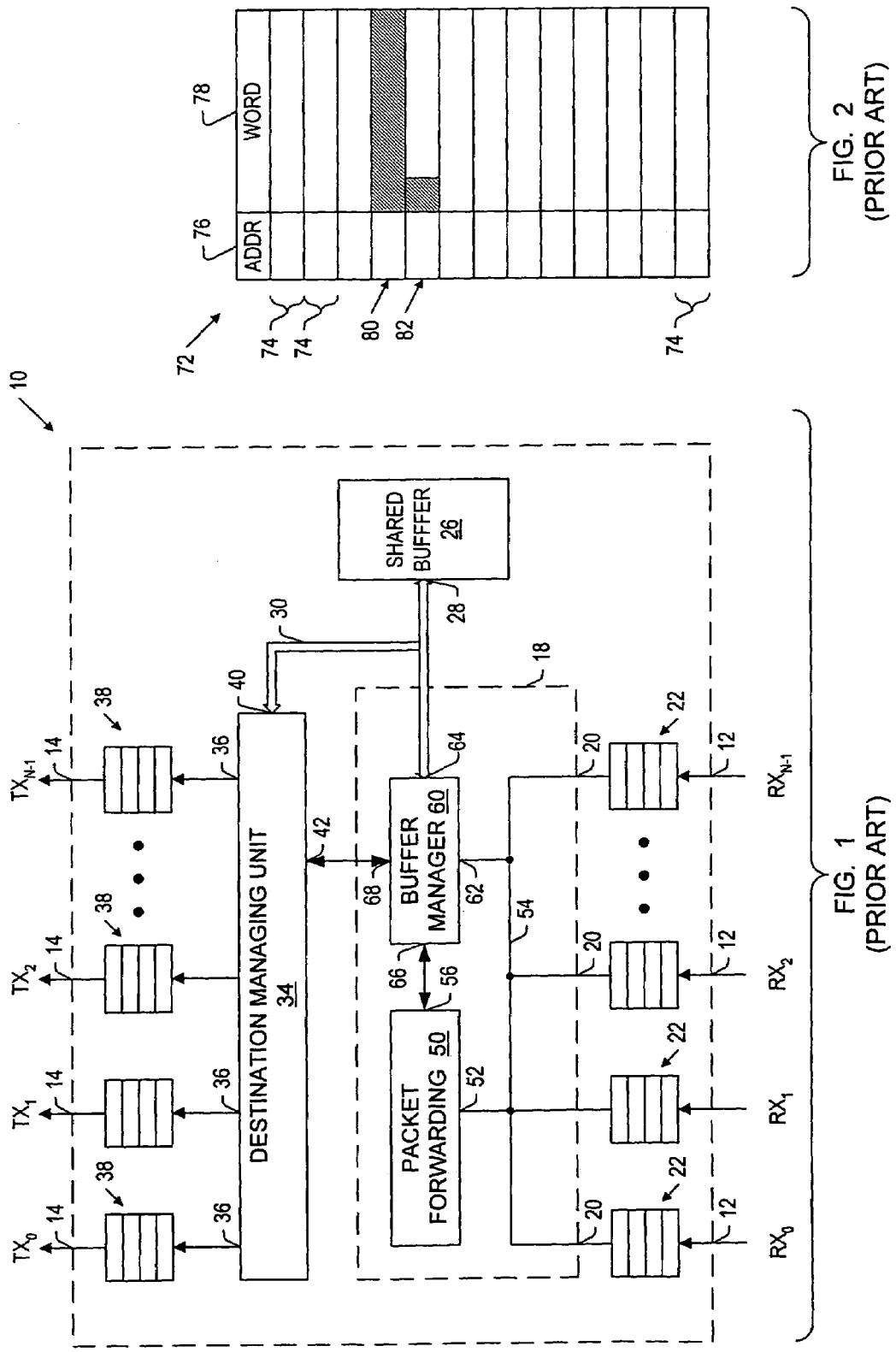

METHOD AND APPARATUS FOR SHARED BUFFER PACKET SWITCHING

BACKGROUND OF THE INVENTION

1. Field of the Invention

The present invention relates generally to packet switching systems and methods, and ore specifically to a shared buffer architecture for packet switching devices.

2. Description of the Prior Art

A wide variety of architectures may be employed in the design of packet switching devices and packet switching fabrics. Examples of common packet switching architectures include cross-bar architectures, ring topology architectures, and shared buffer architectures. Each of the different types of architectures provides different advantages for use in different types of networks. Traditionally, the shared buffer switching architecture has been used in networks supporting the propagation of fixed length packets, commonly referred to as cells. Packet switching devices designed in accordance with conventional shared buffer architectures provide peak bandwidth performance when designed specifically to switch cells of a predetermined length as further explained below. For example, shared buffer switching devices used in asynchronous transfer mode (ATM) networks are typically designed to provide optimal utilization of memory space of the shared buffer, as well as optimal bandwidth performance in an ATM network wherein the cell size is fixed at 53 bytes. Although conventional shared buffer packet switching devices may be used for switching packets of varying lengths, the bandwidth performance of shared buffer switching devices suffers when switching variable length packets because a large amount of memory space of the shared buffer is wasted as further explained below.

FIG. 1 shows a schematic block diagram of a conventional shared buffer packet switching device at 10 which is commonly employed in networks supporting the propagation of cells (e.g., an ATM network). The device 10 includes: a plurality of N serial receive ports 12 designated $RX_0$, $RX_1$, $RX_2$, ..., $RX_{N-1}$ providing serial reception of bits of cells received via associated links (not shown) of a network; and a plurality of N serial transmission ports 14 designated $TX_1$, $TX_2$, $TX_3$, ... $TX_{N-1}$ providing serial transmission of bits of cells via associated links of the network. The serial receive ports $RX_0$, $RX_1$, $RX_2$, ..., $RX_{N-1}$ and associated ones of the serial transmission ports $TX_1$, $TX_2$, $TX_3$, ... $TX_{N-1}$ are typically formed by bi-directional network ports communicatively coupled with associated network links.

The shared buffer switching device 10 further includes: a source managing unit 18 having a plurality of N ports 20 each for receiving cells from an associated one of the receive ports 12 via an associated one of a plurality of N receive buffers 22; a shared buffer 26 having a port 28 communicatively coupled with the source managing unit 18 via a bus 30 as further explained below; and a destination managing unit 34 having a plurality of N ports 36 each being communicatively coupled with an associated one of the transmission ports 14 of the device via an associated one of a plurality of N transmit buffer queues 38. Typically, the shared buffer 26 is implemented using static random access memory (SRAM) technology, and is addressable by the source managing unit 18 and destination managing unit 34 via memory address values as further explained below.

The source managing unit 18 includes: a packet forwarding module 50 for receiving cells from each of the receive buffers 22 via a bus 54, and a port 56 as further explained below; and a buffer managing unit 60 having a port 62 communicatively coupled with each of the receive buffers 22 via the bus 54, and with port 52 of the packet forwarding module 50 via the bus 54, a port 64 communicatively coupled with port 28 of the shared buffer 26 via the memory bus 30, a port 66 communicatively coupled with port 56 of the packet forwarding module, and a port 68 communicatively coupled with port 42 of the destination managing unit 34. Operation of the device 10 is further explained below.

FIG. 2 shows a generalized table diagram illustrating a memory space at 72 of the shared buffer 26 (FIG. 1). The memory space 72 includes a plurality of word locations 74 of the shared buffer memory space, each word location being addressable via a corresponding memory address value 76, and having a word storage space 78 for storing an associated word of data having a word length of B bits. The shared buffer 26 (FIG. 1) is said to have a "width" of B bits, and a "height" equal to the total number of addressable word locations 74. As further explained below, because hardware requirements dictate that the shared buffer 26 have a fixed word length, or width, a bandwidth problem arises in using a shared buffer memory for switching variable length packets.

Referring back to FIG. 1, in operation of the switching device 10, cells are received serially via associated network links at each one of the receive ports 12 and temporarily stored in the associated receive buffers 22 which are used in converting the received cells from the serial data format to a parallel data format for storage in the shared buffer. The packet forwarding module 50 is responsive to address values (e.g., MAC address values) carried by the received cells, and operative to determine destination port information associated with each of the received cells by reading a cell forwarding table (not shown), the destination port information indicating a destination one of the transmission ports 14 associated with the received cell. The packet forwarding module 50 provides the destination port information associated with each one of the received cells to port 66 of the buffer managing unit 60 via its port 56.

The buffer managing unit 60 is operative to determine a memory address value 76 (FIG. 2) associated with each of the received cells, the associated memory address values indicating word locations 74 (FIG. 2) for storing the received cells. The buffer managing unit 60 is then operative to store (write) the received cells in the associated word locations 74 (FIG. 2), and is also operative to provide the destination information and the memory address values associated with of the each cells to port 42 of the destination managing unit 34 which uses the information to perform output queuing operations.

The destination managing unit 34 receives and temporarily stores the destination information and memory address values associated with each of the cells. The destination managing unit 34 includes output queuing logic (not shown) for arbitrating between requests on behalf of received cells for access to associated destination ones of the transmit buffer queues 38. After resolving requests and selecting a received cell for access to an associated one of the transmit buffer queues 38, the destination managing unit 34 reads the selected cell from the associated word location 74 (FIG. 2) of the shared buffer 26 using the associated memory address value, and forwards the cell to the associated one of the transmit buffer queues 38.

Note that one cycle is required to access, that is read or write, a word of data to the shared buffer 26, and therefore the shared buffer 26 may serve one of the receive ports 12 or one of the transmission ports 14 at a time for writing (storing) and reading (retrieving) cells. The switching device 10 is generally synchronous in that cells are received serially by the receive buffers 22, converted from serial to parallel format, and stored in the shared buffer.

The buffer manager 60 accesses word locations 74 (FIG. 2) of the shared buffer 26 in accordance with allocated times slots associated with each of the receive ports 12, and with each of the transmission ports 14. Typically, the access operations are synchronized in accordance with a write cycle in which the buffer manager 60 stores a cell received by each of the N receive ports 12 during each of N write time slots, and a read cycle in which the buffer manager 60 reads a cell to be transmitted from each of the N transmission ports 14 during each of N read time slots. Any time slot allocated for a receive port which has not received a cell is wasted during an associated write cycle. Likewise, any time slot allocated for a particular transmission port is wasted during an associated read cycle if no cell is to be transmitted from the particular transmission port.

As an example of operation of the switching device 10, assume that the device includes N=4 bi-directional ports. In the present example, consider that $RX_0$ receives a cell determined to be destined for $TX_1$, $RX_1$, receives a first cell determined to be destined for $TX_2$, $RX_2$ does not receive any cells, and $RX_3$ receives a second cell determined to be destined for $TX_2$. In this example, during an associated write cycle, the buffer manager 60 stores the cells received by $RX_0$, $RX_1$, and $RX_3$ in associated ones of the word locations 74 (FIG. 2) of the shared buffer. The allocated time slot for storing a cell received by $RX_2$ is wasted in this case because $RX_2$ did not receive any packets. As mentioned, during the read cycle, the buffer manager 60 reads cells stored in associated ones of the word locations 74 (FIG. 2) which are associated with each of the transmission ports 14. In the present example, during the associated read cycle, the buffer manager 60: wastes a first read time slot associated with $TX_0$ as no packets destined for $TX_0$ have been received; reads the cell destined for $TX_1$ during a second read time slot; reads the first cell destined for $TX_2$ during the third read time slot; and wastes a fourth read time slot associated with $TX_3$ as no packets destined for $TX_3$ have been received. After this round of read and write cycles, the second cell destined for $TX_2$ is left in the shared buffer, and will be retrieved during a subsequent read cycle.

In order for a switching device, of any architectural type, to support N ports each having a line rate, R (defined in units of bits per second), the switching device must provide total switching bandwidth performance equal to NR, that is the product of N and R. The bandwidth performance of the shared buffer switching device 10 is a function of clock rate (which is defined by the time required to access the contents of one word location), and the width, B, of the shared buffer. As mentioned, the bandwidth performance of a shared buffer switching device determines the number N of ports which can be served by the device. Therefore, the number of ports which may be supported by the shared buffer device is also a function of the width, B, of the shared buffer. For the shared buffer switching device 10 to provide a total switching bandwidth performance of NR, the memory bandwidth for accessing the packet buffer must be equal to 2NR, thereby providing a write bandwidth of NR and a read bandwidth of NR.

The number N of ports, of a uniform line rate, which may be supported by the shared buffer switching device 10 may be determined in accordance with Relationship (1), below:

$$N=(Clock\_Rate*B)/(2*R) \quad (1)$$

where Clock_Rate is defined in units of cycles per second, B is the width of the shared buffer 26 in bits, and R is the line rate of each of the ports of the switching device.

As an example, assume that the clock rate of the shared buffer switching device is 125 MHz which provides for accessing (read or writing) the contents of a word location 74 (FIG. 2) of the shared buffer in 8 nanoseconds. Also assume that the width, B, of the shared buffer 26 is 512 bits. This provides a total memory bandwidth of 512 bits per every 8 nanoseconds which is equivalent to 64 Gbits per second. A total memory bandwidth of 64 Gbit/s provides a 32 Gbit per second write bandwidth, and a 32 Gbit per second read bandwidth. Because each port has a line rate of 1 Gbit/s, the switching device 10, having a total memory bandwidth of 64 Gbit/s, can support N=32 ports in this example.

As mentioned above, the shared buffer 26 is implemented using SRAM technology. In practice, the size of the shared buffer 26 may be varied by interconnecting a plurality of commercially available standard size memory units. The width, B, of the shared buffer 26 may be varied by interconnecting a plurality of memory units in parallel, and the height of the shared buffer may be varied by interconnecting a plurality of memory units in series. One commercially available standard size memory unit is 1K×16 bits, that is 1000 words in height and 16 bits wide, and therefore provides for storing one thousand 16-bit words. As an example, thirty two of the 1K×16 bits memory units may be arranged in parallel to form a shared buffer having a width, B, of 512 bits, wherein each word storage unit 78 (FIG. 2) of the packet buffer provides a 512 bit word length.

As mentioned above, because hardware requirements dictate that the shared buffer 26 have a fixed word length, or width, bandwidth performance decreases where a shared buffer memory is used for switching variable length packets. Each of the above calculations of bandwidth performance, based on Relationship (1), assumes an ideal case wherein the entire contents of each word storage unit 78 (FIG. 2) of each word location of the shared buffer 26 is utilized for storing a data packet, or a portion of a data packet. The overall bandwidth performance of the switching device 10 decreases if less than the entire contents of each word storage unit 78 (FIG. 2) of each word location is utilized.

As mentioned above, packet switching devices having a shared buffer architecture have traditionally been used only in networks wherein the data packets are fixed length data packets. The overall bandwidth performance of the switching device 10 is maximized where the width of the shared buffer is equal to the fixed length of the cells being switched. However, packet switching devices having a shared buffer architecture have not been traditionally applied for switching variable length data packets because bandwidth performance suffers in such application. If the length of the packets vary, the bandwidth provided by the switching device 10 is decreased. For example in an Ethernet network, packet lengths vary in a range between 64 bytes and 1522 bytes, each of the packets having an integer number of bytes within the defined range. In a worst case scenario, the bandwidth performance of a packet switching device having a shared buffer architecture is most adversely affected where a received packet has a length which is one byte greater than the width, B, of the packet buffer.

Again assuming the above example wherein the shared buffer 26 (FIG. 1) has a width, B, of 512 bits, or 64 bytes, and wherein the device 10 operates at a clock rate of 125 MHz, the bandwidth provided by the switching device 10 is maximized at 64 Gbits/s if each of the received packets has a fixed length of 64 bytes. Bandwidth performance of the packet switching device 10 may be expressed by the product of the width, B, of the shared buffer 26 and the clock rate of the device only if the full memory width is utilized. However, decreased bandwidth performance of the packet switching device, as well as wasted memory space, occurs in response to receiving a packet having a length slightly greater (e.g., one byte greater) than the width of the shared buffer 26 (FIG. 1). For the present example, a worst case bandwidth performance of the packet switching device occurs where a received packet has a length equal to 65 bytes. This problem arises because the bandwidth performance of the packet switching device 10 is dependent upon the portion each word location of the shared buffer 26 which is actually utilized.

As a packet having a length equal to 65 bytes is received at one of the receive ports 12, the first 64 bytes of the received packet are written to a first one of the word locations 74 (FIG. 2) designated 80, and a last byte of the received packet is written to a second one of the word locations 74 designated 82. Only a very small portion of the word storage space 78 of the second word location 82 is used for storing the last byte of the received packet. The remaining portion of the storage space of the second word location 82 cannot be used for storing a next packet, or a portion of a next packet, because the output queuing logic of the destination managing unit 34 (FIG. 1) of the shared buffer architecture requires that the buffer managing unit 60 provide the destination managing unit with one or more memory address values uniquely identifying each packet stored in the shared buffer. Therefore, each one of the word locations 74 (FIG. 2) of the shared buffer may store data of only one of the received packets so that the memory address value associated with the word location only identifies data of a single stored packet. Because of the wasted storage space of the second word location 82, the bandwidth performance of the switching device suffers.

Assuming a constant clock rate, in order to support greater bandwidth performance of the switch, and a greater number of ports, the width of the shared buffer 26 may be increased. However, there is a practical limit to how much the width of the shared buffer 26 may be increased, and it is not practical to increase the width of the shared buffer 26 to 1522 bytes in order to accommodate the longest Ethernet packet.

When rating the bandwidth performance of a switching device, it is necessary to specify the worst case bandwidth performance of the switching device. In the above example, the worst case bandwidth performance of the packet switching device, occurring when a packet having a length of 65 bytes is received, is 32 Gbits/s which is one half of the maximum bandwidth achieved for 64 byte packets. Therefore, only sixteen 1 Gbit ports may be supported by the prior art switching device 10 for switching variable length data packets in the example presented.

SUMMARY OF THE INVENTION

It is an object of the present invention to provide a method and apparatus for shared buffer packet switching of variable length packets wherein bandwidth performance is optimized, and wherein an excess amount of memory storage space is not wasted in the shared buffer.

Briefly, a presently preferred embodiment of the present invention includes a shared buffer packet switching device for receiving data packets via associated ones of a plurality of receive ports, and for transmitting data packets via associated selected ones of a plurality of transmit port. The shared buffer packet switching device includes: a shared buffer unit for temporarily storing at least a portion of each of a plurality of the data packets received via the receive ports, the shared buffer including a plurality of word locations each being associated with a shared buffer memory address value, and having an associated word storage space, the word storage spaces defining a shared buffer memory width; a tail buffer for temporarily storing remainder portions of selected ones of the received data packets, the tail buffer including a plurality of tail buffer locations each being associated with a tail buffer memory address value, and an associated tail data storage space, the tail data storage spaces defining a tail buffer memory width; and a source managing unit for receiving packets via the input ports, and being operative to store each of the received packets in selected ones of the word locations and the tail buffer locations. In one embodiment of the present invention, the received packets are variable length data packets.

The source managing unit further includes: a packet forwarding module operative to determine destination information associated with each of the received data packets, the destination information indicating an associated destination one of the transmit ports; and a buffer managing unit for determining at least one shared buffer memory address value associated with each of the received packets, and for determining a tail buffer memory address value for selected ones of the received packets.

A destination managing unit receives the destination information, the shared buffer memory address values, and tail buffer memory address values, and is operative to access each of the data packets stored in the shared buffer and the tail buffer using the shared buffer memory address values and the tail buffer memory address values.

The buffer managing unit is operative to perform the steps of: dividing a received packet by the shared buffer memory width to determine a number of the word locations required for storing the received packet, and a remainder number of bits; storing at least a portion of the received packet in at least one associated word location; comparing the remainder number of bits to the tail buffer memory width; determining if the remainder number of bits is less than the tail buffer memory width; if the remainder number of bits is less than the tail buffer memory width, storing the remainder number of bits of the received packet in an associated tail buffer location; and if the remainder number of bits is greater than the tail buffer memory width, storing the remainder number of bits of the received packet in an associated additional word location.

An important advantage of the shared buffer packet switching device of the present invention is that bandwidth performance in switching data packets of a variable length is enhanced by use of the tail buffer. Bandwidth performance of a shared buffer memory switching device is directly proportional to the width of the shared buffer and the percentage of utilized memory space of word locations of the shared buffer. Use of the tail buffer allows for less wasted shared buffer memory space for storing packets for which the remainder number of bits is less than the tail buffer memory width.

The foregoing and other objects, features, and advantages of the present invention will be apparent from the following detailed description of the preferred embodiment which makes reference to the several figures of the drawing.

IN THE DRAWING

FIG. 1 is a schematic circuit block diagram of a conventional shared buffer packet switching device;

FIG. 2 is a generalized table diagram illustrating a memory space of a shared buffer of the conventional switching device of FIG. 1;

DETAILED DESCRIPTION OF THE PREFERRED EMBODIMENTS

Figure 3:
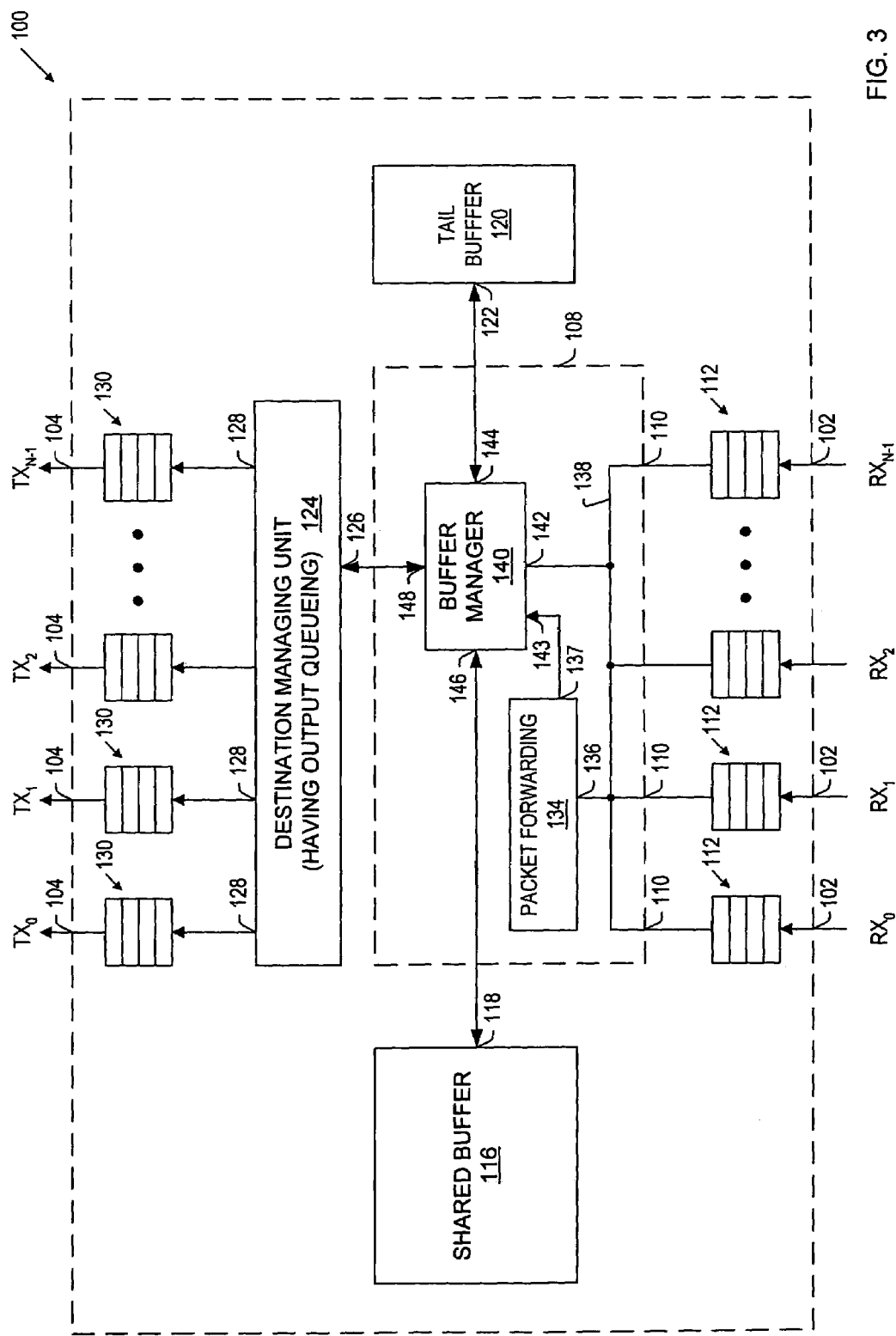
FIG. 3 is a schematic circuit block diagram of a shared buffer packet switching device having a shared buffer and a tail buffer in accordance with the present invention.

FIG. 3 shows a schematic circuit block diagram of a shared buffer packet switching device at 100 in accordance with the present invention. The device 100 includes: a plurality of N serial receive ports 102 designated $RX_0$, $RX_1$, $RX_2$, . . . , $RX_{N-1}$ for serially receiving data packets via associated links of a network (not shown); and a plurality of N serial transmission ports 104 designated $TX_1$, $TX_2$, $TX_3$, . . . $TX_{N-1}$ for transmitting packets via links of a network. In an embodiment, the serial receive ports $RX_0$, $RX_1$, $RX_2$, . . . , $RX_{N-1}$ and associated ones of the serial transmission ports 104 $TX_1$, $TX_2$, $TX_3$, . . . $TX_{N-1}$ are formed by associated bi-directional ports.

The shared buffer packet switching device 100 further includes: a source managing unit 108 having a plurality of N ports 110 each for receiving packets from an associated one of the serial receive ports 102 via an associated one of a plurality of N receive buffers 112; a shared packet buffer 116 having a port 118 communicatively coupled with the source managing unit as further explained below; a tail buffer 120 having a port 122 communicatively coupled with the source managing unit as further explained below; a destination managing unit 124 having a port 126 communicatively coupled with the source managing unit as further explained below; a plurality of N ports 128 each being communicatively coupled with an associated one of the serial transmission ports 104 of the device via an associated one of a plurality of N transmit buffers 130. Typically, the shared packet buffer 116 and the tail buffer 120 are both implemented using static random access memory (SRAM) technology.

The source managing unit 108 includes: a packet forwarding module 134 having a port 136 for receiving packets from each of the receive buffers 112 via a bus 138, and a port 137 further explained below; and a buffer managing unit 140 having a port 142 communicatively coupled with each of the receive buffers 112 via the bus 138 and with port 136 of the packet forwarding module 134 via the bus 138, a port 143 communicatively coupled with port 137 of the packet forwarding module, a port 144 communicatively coupled with port 122 of the tail buffer 120, a port 146 communicatively coupled with port 118 of the shared packet buffer 116, and a port 148 communicatively coupled with port 126 of the destination managing unit 124. Operation of the device 100 is further explained below.

Figure 4:
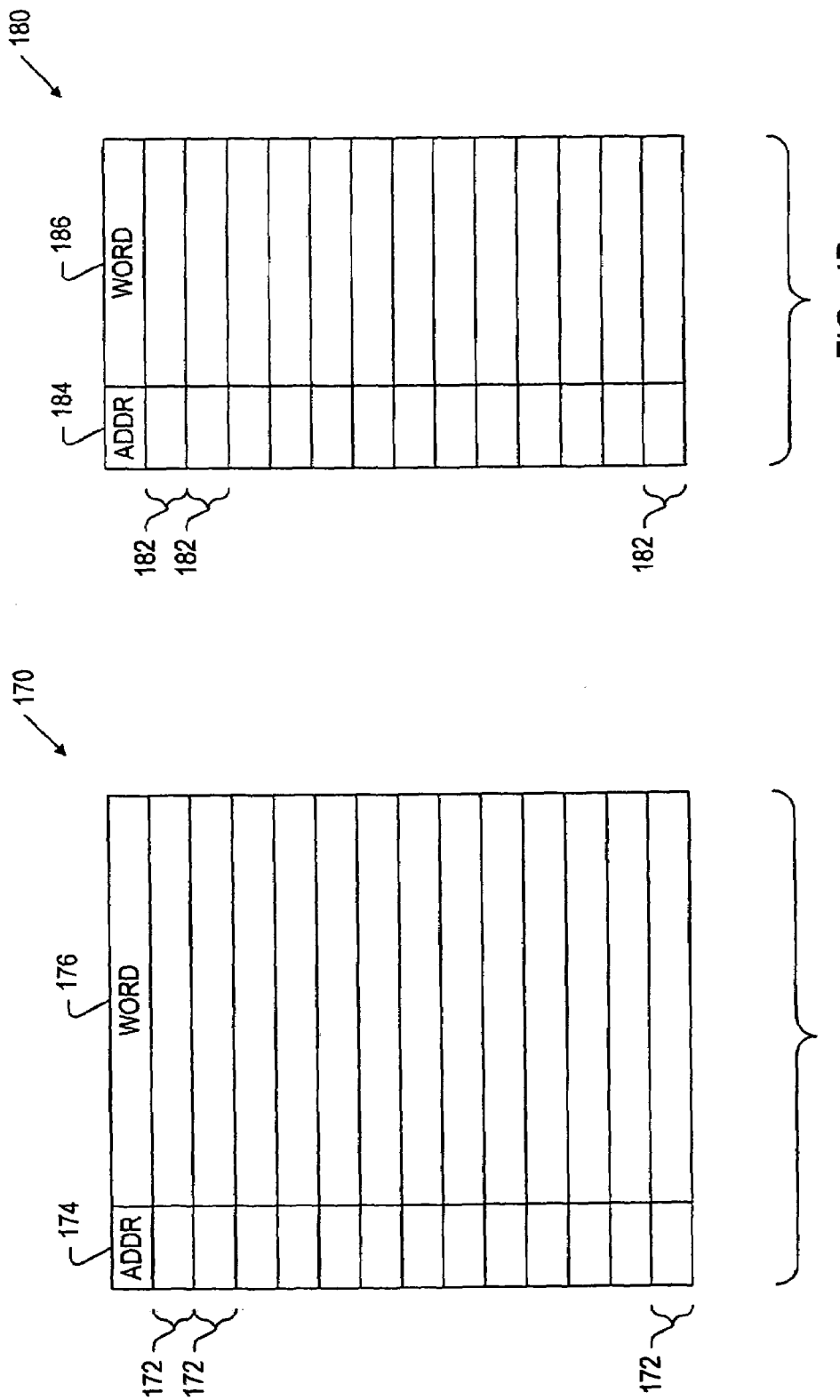
FIG. 4A is a generalized table diagram illustrating a memory space of the shared buffer of FIG. 3.
FIG. 4B is a generalized table diagram illustrating a memory space of the tail buffer of FIG. 3.

FIG. 4A shows a generalized table diagram illustrating a memory space at 170 of the shared buffer 116 (FIG. 3). The memory space 170 includes a plurality of word locations 172 of the shared buffer memory space, each word location being addressable via a corresponding shared buffer memory address value 174, each word location having an associated word storage space 176 for storing an associated word of data having a word length of $B_S$ bits. The shared buffer 116 (FIG. 3) is said to have a "width" of $B_S$ bits, and a "height" equal to the total number of addressable word locations 172. In an embodiment, the word storage space 176 of each word location provides for storing a portion of data having a maximum length of $B_S$=64 bytes.

FIG. 4B shows a generalized table diagram illustrating a memory space at 180 of the tail buffer 120 (FIG. 3). The memory space 180 includes a plurality of tail buffer locations 182 each being addressable via a corresponding tail buffer memory address value 184, and having a tail data storage space 186 for storing an associated portion of data having a maximum length of $B_T$ bits. The tail buffer 120 (FIG. 3) is said to have a "width" of $B_T$ bits, and a "height" equal to the total number of addressable locations 182 in the tail buffer. In an embodiment, the storage space 186 of each tail buffer location provides for storing an associated portion of data having a maximum length of $B_T$=16 bytes.

Referring back to FIG. 3, in operation of the switching device 100, packets are received serially via associated network links (not shown) at each one of the receive ports 102 and temporarily stored in the receive buffers 112 which are used in converting the received packets from the serial data format to a parallel data format. The packet forwarding module 134 is responsive to address values (e.g., MAC address values) carried by the received packets, and is operative to determine destination port information associated with each of the received packets by reading a packet forwarding table (not shown), the destination port information indicating a destination one of the transmission ports 104 associated with the received packet. The packet forwarding module 134 provides the destination port information associated with each one of the received packets to port 143 of the buffer managing unit 140 via its port 137.

The buffer managing unit 140 is operative to determine selected ones of the word locations 172 (FIG. 4A), as well as selected ones of the tail buffer locations 182 if appropriate, for storing the received packets. The buffer managing unit 140 is operative to perform the steps of: dividing a received packet by the width $B_S$ of the shared buffer 116, and determining a remainder number of bits; comparing the remainder number of bits to the width $B_T$ of the tail buffer; determining if the remainder number of bits is less than the width $B_T$ of the tail buffer; if the remainder number of bits is less than the width $B_T$ of the tail buffer, using one of the tail buffer locations 182 (FIG. 4B) to store the remainder number of bits of the received packet; and if the remainder number of bits is greater than the width $B_T$ of the tail buffer, using an additional one of the word locations 172 (FIG. 4A) to store the remainder number of bits of the received packet.

The buffer managing unit 140 is operative to determine: at least one shared buffer memory address value 172 (FIG. 4A) associated with each of the received packets; and an associated tail buffer memory address value 184 (FIG. 4B) if appropriate as explained above. The associated shared buffer memory address values indicate word locations 172 (FIG. 2) for storing at least portions of received packets, and the tail buffer memory address values indicate associated tail buffer locations 182 (FIG. 4B) for storing remainder portions of received packets. The buffer managing unit 140 is operative to store (write) an associated portion of the received packets in the associated word locations 172 (FIG. 4A), and also in the associated tail buffer location when appropriate. The buffer managing unit 140 is also operative to provide the destination information and the memory address values associated with of the each packets to port 126 of the destination managing unit 124.

The destination managing unit 124 receives and temporarily stores the destination information and memory address values associated with each of the packets. The destination managing unit 124 includes output queuing logic (not shown) for arbitrating between requests on behalf of received packets for access to corresponding ones of the transmit buffer queues 130. After resolving requests and selecting a received packet for access to an associated one of the transmit buffer queues 130, the destination managing unit 124 reads at least a portion of the selected packet from the associated word location 172 (FIG. 4A) of the shared buffer using the associated shared buffer memory address value(s) 174, and also reads an associated portion of the selected packet from the associated tail buffer location 182 (FIG. 4B) of the tail buffer using an associated tail buffer memory address value(s) 184 if applicable. After reading the selected packet from the shared buffer, and from the associated tail buffer if applicable, the destination managing unit 124 forwards the packet to the associated one of the transmit buffer queues 130.

An important advantage of the shared buffer packet switching device of the present invention is that bandwidth performance in switching data packets of a variable length is enhanced by use of the tail buffer. Bandwidth performance of a shared buffer memory switching device is directly proportional to the width of the shared buffer and the percentage of utilized memory space of word locations of the shared buffer. Use of the tail buffer allows for less waste of shared buffer memory space for storing packets for which the remainder number of bits is less than the tail buffer memory width $B_T$. Portions of word locations 172 (FIG. 4A) of the shared buffer are only wasted for cases wherein the remainder number of bits for a packet (after dividing the length of the packet by the shared buffer memory width $B_S$) is greater than the tail buffer memory width $B_T$. In accordance with the present invention, the memory width $B_T$ of the tail buffer, and the memory width $B_S$ of the shared buffer may be may be varied in order to optimize bandwidth performance and utilization of memory space.

Referring back to both FIGS. 4A and 4B, in one embodiment of the present invention, assume that the shared buffer 116 (FIG. 3) includes a number of word locations 172 (FIG. 4A) equal to the number of tail buffer locations 182 (FIG. 4B) in the tail buffer 120 (FIG. 3), and therefore the height of the shared buffer is equal to the height of the tail buffer. An unnecessary disadvantages arise in this embodiment if the range of variation of the length packets is large because several of the word locations 172 (FIG. 4A) may be required store a single large packet, while a maximum of only one of the tail buffer locations 182 (FIG. 4B) is required to store a remaining portion of the packet. Much of the memory space of the tail buffer is wasted in this embodiment because of the one to one relation ships between word locations 172 (FIG. 4A) and tail buffer locations 182 (FIG. 4B).

Assume further that output queuing operations performed by the destination managing unit are performed on a word level wherein portions of the shared buffer memory space 170 (FIG. 4A) are assigned to associated packets one word location 172 (FIG. 4A) at a time. In this case, two portions of a data packet may be stored in nonconsecutive ones of the word locations because different ones of the receive ports 102 (FIG. 3) write to the shared buffer 116 (FIG. 3) at different times.

As an example, referring to FIG. 4A, three portions of a received data packet may be stored in three separate nonconsecutive word locations designated 190, 192, and 194. In accordance with word level output queuing, the buffer managing unit 140 (FIG. 3) must determine a plurality of associated shared buffer memory address values 174 (FIG. 4A) for each packet having a length greater than or equal to twice the width of the shared buffer, in addition to a tail buffer memory address value 184 (FIG. 4B) if required. Also in accordance with word level output queuing, the destination managing unit 124 must be provided with a plurality of associated shared buffer memory address values, and a tail buffer memory address value if required, for each received data packet which has a length greater than twice the width of the shared buffer. Generating and using more than one shared buffer memory address value for storing and accessing packets in the shared buffer is somewhat cumbersome because additional registers are required for storing the memory address values. In summary, word level queuing may not be ideal for some switching applications because a large tail buffer is required, and because additional registers are required for storing more than one memory address value for accessing each packet.

Figure 5:
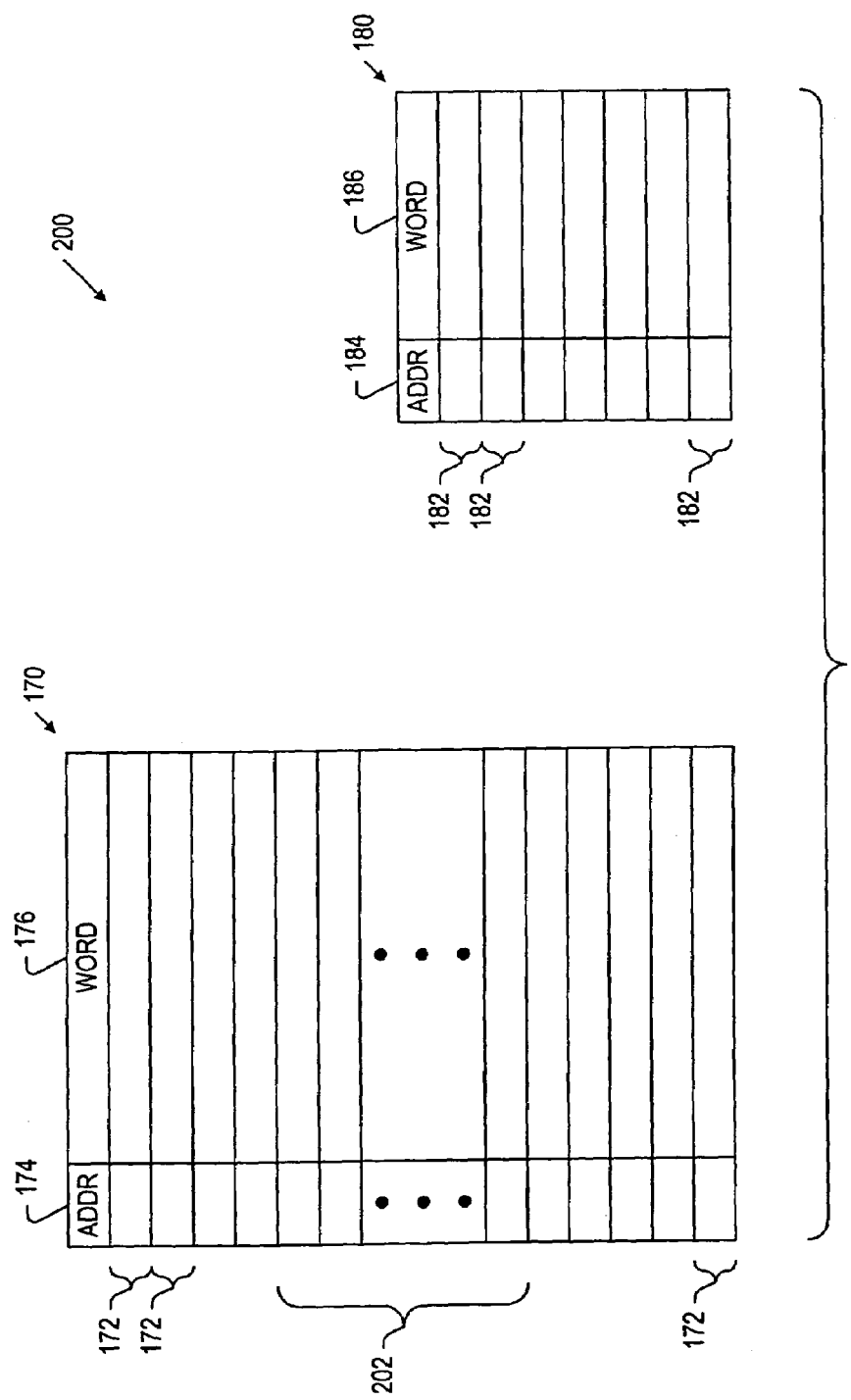
FIG. 5 is a generalized table diagram illustrating an embodiment of the present invention wherein the height of the shared buffer is greater than the height of the tail buffer.

FIG. 5 shows a generalized table diagram illustrating an embodiment of the present invention at 200 wherein the height of the shared buffer 116 (FIG. 3) is greater than the height of the tail buffer 120 (FIG. 3). In this embodiment, at least one memory space unit 202 of the buffer memory space, including a plurality of consecutive ones of the word locations 172, is assigned by the buffer managing unit 140 (FIG. 3) for storing each received data packet. In this design, only one tail buffer location 182 is required for each memory space unit 202. Also in this embodiment, the output queuing scheme is referred to as a block level queuing scheme because only one tail buffer location 182 is required for each memory space unit 202 which includes a block of the word locations 172.

In one embodiment of the present invention, the width of the shared buffer 116 (FIG. 3) is 64 bytes, and each of the memory space units 202 includes eight of the word locations 172 thereby providing 512 bytes of storage space. As an example, the total shared buffer memory space is 16K words×64 Bytes providing for 1 Megabyte of shared buffer storage space, and the total tail buffer memory space is 2K words×16 Bytes providing for 32 Kilobytes of tail buffer storage space. A packet switching device in accordance with the embodiment shown in FIG. 5 allows for use of a tail buffer having a smaller height, less tail buffer locations, than the word level queuing embodiment because in this block level queuing scheme, only one tail buffer location 182 is required for each memory space unit 202, as opposed to the word level queuing scheme wherein one tail buffer location is required for each word location.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A shared buffer packet switching device for receiving and transmitting data packets, comprising:

a shared buffer for temporarily storing at least a portion of each of a plurality of the data packets received, said shared buffer including a plurality of word locations each being associated with a shared buffer memory address value, and defining a shared buffer memory width;

a tail buffer for temporarily storing remainder portions of selected ones of the received data packets, said tail buffer including a plurality of tail buffer locations each being associated with a tail buffer memory address value, and defining a tail buffer memory width; and a source managing unit for receiving the packets, and being operative to store data of the received packets in selected ones of said word locations and said tail buffer locations.

2. A shared buffer packet switching device as recited in claim 1 wherein the received packets are variable length data packets.

3. A shared buffer packet switching device as recited in claim 1 wherein the received packets are variable length Ethernet packets.

4. A shared buffer packet switching device as recited in claim 1 wherein said source managing unit further comprises:

a packet forwarding module operative to determine destination information associated with each of the received data packets; and a buffer managing unit for determining at least one shared buffer memory address value associated with each of the received packets, and for determining a tail buffer memory address value for selected ones of the received packets.

5. A shared buffer packet switching device as recited in claim 4 further comprising a destination managing unit for receiving said destination information, said shared buffer memory address values, and tail buffer memory address values, and being operative to access the data packets stored in said shared buffer and said tail buffer using said shared buffer memory address values and said tail buffer memory address values, and being further operative to transmit each of said stored data packets to an associated destination indicated by said associated destination information.

6. A shared buffer packet switching device as recited in claim 4 wherein said buffer managing unit is operative to perform the steps of:

dividing a received packet by said shared buffer memory width to determine a required number of said word locations for storing said received packet, and a remainder number of bits;

storing at least a portion of said received packet in at least one associated word location;

comparing said remainder number of bits to said tail buffer memory width;

when said remainder number of bits is less than said tail buffer memory width, storing said remainder number of bits of said received packet in an associated tail buffer location; and when said remainder number of bits is greater than said tail buffer memory width, storing said remainder number of bits of said received packet in an associated additional word location.

7. A shared buffer packet switching device as recited in claim 4 wherein said buffer managing unit is operative to perform the steps of:

dividing a received packet by said shared buffer memory width to determine a required number of said word locations for storing said received packet, and a remainder number of bits;

determining at least one shared buffer memory address value for accessing at least one associated word location for storing at least a portion of said received packet;

comparing said remainder number of bits to said tail buffer memory width;

when said remainder number of bits is less than said tail buffer memory width, determining an associated tail buffer memory address value indicating an associated tail buffer location for storing the remaining bits of said received packet; and when said remainder number of bits is greater than said tail buffer memory width, determining an additional shared buffer memory address value for accessing an associated additional word location for storing the remaining bits of said received packet.

8. A shared buffer packet switching device as recited in claim 7 further comprising a destination managing unit for receiving said determined shared buffer memory address values, and tail buffer memory address values, and being operative to access said received data packets stored in said buffer and said tail buffer.

9. A shared buffer packet switching device as recited in claim 4 wherein said buffer managing unit is operative to allocate memory space of shared buffer in units of one word location each for storing at least a portion of an associated one of the received data packets, and wherein each of said word locations is associated with one of said tail locations.

10. A shared buffer packet switching device as recited in claim 4 wherein said buffer managing unit is operative to allocate memory space of said shared buffer in memory space units including a plurality of said word locations, each memory space unit for storing at least a portion of an associated one of said data packets, and wherein each of said memory space units is associated with one of said tail locations.

11. A shared buffer packet switching device as recited in claim 10 wherein the height of said tail buffer, defined by a total number of said tail locations, is less than the height of said shared buffer defined by a total number of said word locations.

12. In a shared buffer packet switching device for receiving and transmitting data packets, the device including a shared buffer for temporarily storing at least a portion of each of a plurality of the data packets, said shared buffer including a plurality of word locations defining a shared buffer memory width, and a tail buffer to temporarily storing remainder portions of selected ones of the received data packets, said tail buffer including a plurality of tail buffer locations defining a tail buffer memory width, a process of managing the storage of the received packets in the shared buffer and the tail buffer comprising the steps of:

determining at least one shared buffer memory address value associated with each of the received packets; and determining a tail buffer memory address value for selected ones of the received packets.

13. In a shared buffer packet switching device for receiving and transmitting data packets, the device including a shared buffer to temporarily storing at least a portion of each of a plurality of the data packets, said shared buffer including a plurality of word locations defining a shared buffer memory width, and a tail buffer for temporarily storing remainder portions of selected ones of the received data packets, said tail buffer including a plurality of tail buffer locations defining a tail buffer memory width, a process of managing the storage of the received packets in the shared buffer and the tail buffer comprising the steps of:

dividing a received packet by said shared buffer memory width to determine a required number of said word locations for storing said received packet, and a remainder number of bits;

storing at least a portion of said received packet in at least one associated word location;

comparing said remainder number of bits to said tail buffer memory width;

when said remainder number of bits is less than said tail buffer memory width, storing said remainder number of bits of said received packet in an associated tail buffer location; and when said remainder number of bits is greater than said tail buffer memory width, storing said remainder number of bits of said received packet in an associated additional word location.

14. A shared buffer packet switching device for receiving and transmitting data packets, comprising:

a shared buffer means for temporarily storing at least a portion of each of a plurality of the data packets received, said shared buffer means including a plurality of word locations each being associated with a shared buffer memory address value, and defining a shared buffer memory width;

a tail buffer means for temporarily storing remainder portions of selected ones of the received data packets, said tail buffer means including a plurality of tail buffer locations each being associated with a tail buffer memory address value, and defining a tail buffer memory width; and a source managing means for receiving the packets and storing data of the received packets in selected ones of said word locations and said tail buffer locations.

15. A shared buffer packet switching device as recited in claim 14 wherein the received packets are variable length data packets.

16. A shared buffer packet switching device as recited in claim 14 wherein the received packets are variable length Ethernet packets.

17. A shared buffer packet switching device as recited in claim 14 wherein said source managing means further comprises:

a packet forwarding means for determining destination information associated with each of the received data packets, said destination information indicating an associated destination one of said transmit ports; and a buffer managing means for determining at least one shared buffer memory address value associated with each of the received packets, and for determining a tail buffer memory address value for selected ones of the received packets.

* * * * *

UNITED STATES PATENT AND TRADEMARK OFFICE
CERTIFICATE OF CORRECTION

| | | |
|---|---|---|
| PATENT NO. | : 7,315,550 B2 | Page 1 of 1 |
| APPLICATION NO. | : 10/703523 | |
| DATED | : January 1, 2008 | |
| INVENTOR(S) | : Chuen-Shen Bernard Shung | |

It is certified that error appears in the above-identified patent and that said Letters Patent is hereby corrected as shown below:

On the title page after item (22) insert item (63),

The Related U.S. Application Data should read as follows:

--Continuation of application No. 09/526,102, filed on March 15, 2000, now Pat. No. 6,700,894.--

Signed and Sealed this

Twenty-seventh Day of May, 2008

JON W. DUDAS
*Director of the United States Patent and Trademark Office*